United States Patent

[11] 3,607,654

[72] Inventors Kazuo Mochizuki
Sunto-gun;
Masahiro Kohagura, Sunto-gun; Tsuneo Kagawa, Sunto-gun; Masao Tanaka, Machida-shi, all of Japan
[21] Appl. No. 828,386
[22] Filed May 27, 1969
[45] Patented Sept. 21, 1971
[73] Assignee Kyowa Hakko Kogyo Co., Ltd.
Tokyo, Japan
[32] Priority June 15, 1968
[33] Japan
[31] 43/40854

[54] PROCESS FOR PRODUCING PURIFIED L-ASPARAGINASE
14 Claims, No Drawings

[52] U.S. Cl. ........................................................ 195/66 A
[51] Int. Cl. .................................................. C12d 13/10
[50] Field of Search ............................................ 195/66 A

[56] References Cited
OTHER REFERENCES
Whelan et al., Fed. Proceedings page 586 (abstract 2082) (April 1968)

Primary Examiner—Lionel M. Shapiro
Attorney—Craig, Antonelli, Stewart & Hill

ABSTRACT: The antitumor activity of L-asparaginase produced from the cultured cells of micro-organisms belonging to the genus Serratia is retained by a purification process wherein the substrate, L-asparagine, is added to the enzyme-containing solution recovered from the cells and the pH of the solution is adjusted to 4.0 or less, preferably 3.0–3.5. In this way, the L-asparaginase-inactivating factors are eliminated without impairing the activity of the L-asparaginase. This treatment can be used on a crude enzymatic solution, with subsequent purification steps, or it can be employed with an already purified L-asparaginase solution.

PROCESS FOR PRODUCING PURIFIED L-ASPARAGINASE

This invention relates to a process for purifying L-asparaginase. More particularly, it relates to a process for purifying L-asparaginase obtained from cultured cells of an L-asparaginase-producing micro-organism. Even more particularly, the invention relates to the production of L-asparaginase having an antitumor activity and to enzymatic preparations of high purity which have an antitumor activity.

L-asparaginase, that is, L-asparagine-amide hydrolase (having an enzyme number of 3,5,1,1), is an enzyme which hydrolyzes L-asparagine into L-aspartic acid and ammonia. This enzyme is relatively extensively distributed in the plant and animal worlds, however, many of the details of its properties are yet unknown. Recently, L-asparaginase derived from specific sources, such as, for instance, the L-asparaginase produced by the serum of guinea pigs and from certain strains of *Escherichia coli*, has attracted much attention since it has been found that the enzymes derived from such sources have a remarkable effect against acute leukemia. A mass production of this enzyme for use as pharmaceuticals has, however, been hindered by many problems and particularly by the fact that the types of enzyme having an antitumor activity have been limited. Accordingly, the supply of enzymatic sources is poor and, furthermore, it is difficult to carry out a purification procedure to the extend necessary to obtain a purified enzymatic preparation which can be employed as a pharmaceutical. For these reasons and others, solutions to these problems have long been sought in the prior art.

Previously, the present inventors succeeded in solving the problem of an enzymatic source for antitumor active L-asparaginase by cultivating a micro-organism belonging to the genus *Serratia* with aeration and agitation (Japanese Pat. application No. 9116/68, corresponding to U.S. application Ser. No. 798443, filed on Feb. 11, 1969). Basic studies have been continued concerning the separation and purification of the desired enzyme.

Heretofore, L-asparaginase produced by micro-organisms belonging to the genus *Serratia* has been found to be extremely poor with respect to its stability during the purification stages and it loses its activity during the purification procedures in an unexpected manner, in spite of the fact that said L-asparaginase is stable by nature in a relatively wide range of pH and temperatures. Because of this instability, all of the purification procedures required have had to be effected very rapidly and it is extremely difficult to obtain a preparation having a high purity on an industrial scale. However, no definite answers have been available as to the causes and the solutions to the problem.

Accordingly, one of the objects of the present invention is to provide an improved process for the production of purified L-asparaginase preparations which overcomes the disadvantages and deficiencies of the prior art methods.

Another object of the present invention is to provide a process for purifying L-asparaginase which may be carried out in an efficacious and relatively simple manner and which will not create a serious loss of antitumor activity in the resultant product.

A further object of the invention is to provide a process for producing a purified enzymatic preparation of L-asparaginase having an antitumor activity on an economical and industrial scale.

A still further object of the invention is to provide L-asparaginase of high purity.

These and other objects and advantages of the present invention will become apparent to those skilled in the art from a consideration of the following specification and claims.

As a result of various studies concerning the causes of the above-described loss of activity, the present inventors have discovered that a micro-organism belonging to the genus *Serratia* produces relatively strong L-asparaginase inactivating factors in its cells simultaneously with the production of L-asparaginase. As a result, the desired L-asparaginase loses its activity because these inactivating factors are extracted together with the L-asparaginase when the cells are destructed. Furthermore, unless these factors are removed, it is not only impossible to obtain a purified preparation of L-asparaginase in a good yield, but also a sufficient antitumor effect cannot be obtained in an enzymatic preparation containing the inactivating factors even if such a purified preparation is produced.

The present inventors have made repeated studies concerning a purification process of L-asparaginase, based on the findings concerning the aforementioned inactivating factors, and have found, in accordance with the present invention, that a purification of the present enzyme can be extremely easily carried out by denaturing and thereby rendering the L-asparaginase inactivating factors ineffective without impairing the activity of the L-asparaginase. Based on this finding, the present inventors have succeeded in establishing a novel process for the production of highly pure L-asparaginase on an industrial scale.

The objectives of the present invention are attained by producing L-asparaginase from the cultured cells of an L-asparaginase-producing micro-organism belonging to the genus *Serratia* and adjusting the pH value of the crude enzymatic aqueous solution of 2.5–4.0 in the presence of the substrate thereof, i.e., L-asparagine, at a proper time during the purification stages, preferably at as early a purification stage as possible. In this manner, the L-asparaginase inactivating factors lose their activity while the L-asparaginase itself is saved from losing its activity and, thus, the decomposition of the desired enzyme is prevented. Accordingly, the subsequent purification is carried out in good yield.

The present inventors previously discovered that treating a crude enzymatic liquid with an acid is effective as a way of purifying L-asparaginase and therefore developed a purification process utilizing said acidic treatment (Japanese Pat. application No. 22328/68). In the present invention, an even more effective process for purifying L-asparaginase has been accomplished by further applying the studies on the effect of the acidic treatment on the inactivating factors in the culture liquor. Hence, as a result of detailed studies concerning the difference of stability against pH between L-asparaginase and the inactivating factor thereof, it has been found that the inactivating factors lose their activity quickly at pH 3.5 or lower, and the loss encountered thereby is irreversible while the L-asparaginase is found to retain its activity even at a pH value of around 2.5. Furthermore, it has been found that the loss of activity of the L-asparaginase by acidic denaturation is remarkably lessened by the presence of its substrate, i.e., L-asparagine, while the inactivating factors are not at all influenced thereby. Table 1 shows the loss of activity of the L-asparaginase inactivating factors by denaturation with pH and the protective effect of the substrate on L-asparaginase.

TABLE 1

Loss of activity of the inactivating factors by acidic denaturation and the protection of L-asparaginase by the substrate

| pH | Residual rate of activity of L-asparaginase (%) | |
|---|---|---|
| | Substrate not added | Substrate added |
| 9.0 (no treatment) | 0 | 0 |
| 5.0 | 0 | 0 |
| 4.0 | 16 | 30 |
| 3.5 | 62 | 104 |
| 3.0 | 72 | 100 |
| 2.5 | 41 | 81 |
| 2.0 | 4 | 25 |

Table 1 shows the results of measurements wherein an L-asparaginase crude aqueous liquid containing the inactivating factors was adjusted to the pH values recited in the Table both in the presence of ($10^{12}$ M) and in the absence of its substrate (L-asparagine) and, thereafter the pH value was immediately adjusted to 5.5, the optimum pH value for the action of the inactivating factors, and the solution was allowed to react for two hours at 37° C., whereupon the residual activity of L-asparaginase in the reaction liquid was measured. The rate of residual activity is expressed in percentage on the basis of the enzymatic activity of the original sample liquid which is taken as 100. As is shown in Table 1, the inactivating factors survive at a pH of 4.0 or higher and the L-asparaginase loses its activity completely after a two hour reaction at 37° C. at pH 5.5 in a similar way as in the case where no treatment is conducted. In contrast to this, the inactivating factors lose their activity at pH 3.5 or lower and the inactivation of L-asparaginase resulting from the inactivating factors can be prevented almost completely. However, a treatment at pH 3.5 or lower causes the L-asparaginase itself to be denatured and the loss of activity by denaturation is considerably large at pH 2.0. However, this loss of activity of L-asparaginase due to the acidic treatment is greatly lessened when its substrate, L-asparagine, is added to the solution. Thus, an acidic treatment in the presence of the substrate makes it possible to inhibit or destroy the inactivating factors while at the same time retaining the L-asparaginase activity in a stable state.

As discussed above, the present invention makes it possible for the inactivating factors alone to lose their activity almost completely by adjusting the pH value of the L-asparaginase crude enzymatic solution in the presence of the substrate, L-asparagine, to a value of 3.5 or lower (preferably 3.5–3.0). Accordingly, a reaction time of from several minutes to several hours can be employed without significant differences being observed. However, a treatment with a short period of time is preferable in view of the effect upon L-asparaginase. Also, it is preferred to keep the temperature of treatment somewhat low. Particularly, no differences are observed at 0°–10 C. as to the loss of activity of the inactivating factors. The amount of substrate, L-asparagine, to be added to the solution differs depending upon the concentration of the enzyme, but it is sufficient to add a concentration of $10^{12}$M or higher in the ordinary cases. Various mineral acids and organic acids are used for the adjustment of the pH values, however, it has been found that hydrochloric acid is the most suitable pH adjusting agent because of the subsequent purification steps which are carried out. It is preferred to conduct the pH adjustment of the invention at an early stage during the processing, such as on the crude enzymatic extract liquid, however, the procedure of the invention can also be satisfactorily applied to a high-purity preparation.

By operating in accordance with the invention to make the inactivating factors lose their activity completely makes it possible to easily raise the purity of the preparation in subsequent processing steps, such as those commonly employed in various purification methods for enzymatic preparations, such as, for example, by ion exchange chromatography and by other means of chromatography using adsorbing agents. In this manner, L-asparaginase preparations which can be utilized as pharmaceuticals are obtained in a good yield.

Insofar as the composition of the fermentation medium and the culturing method used is concerned, conventional procedures used in fermentation methods are employed in obtaining the L-asparaginase-containing cells. Thus, either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, etc. These substances may be used either singly or in mixtures of two or more. As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc.

The fermentation or culturing of the micro-organisms is conducted under aerobic conditions, such as aerobic shaking of the culture or with stirring and aeration of a submerged culture, at a temperature of, for example, about 25 to 42° C. and at a pH of, for example, about 4.0 to 8.5. After about 1 to 2 days of culturing under these conditions, L-asparaginase-containing cells are found to be accumulated in the resultant culture liquor.

After the completion of culturing, the cells can be disrupted in a conventional manner and a crude enzymatic extract liquid collected therefrom. Further treatment is then carried out in accordance with the present invention.

The following example is given merely as illustrative of the present invention and is not to be considered as limiting. Unless otherwise noted, the percentages therein and throughout the application are by weight per liter of water.

EXAMPLE

*Serratia marcescens* ATCC 60 is cultivated with aeration and agitation until a sufficient quantity of cells is obtained. The resultant cells are suspended in a 0.01 M tris(hydroxymethyl) aminomethane-hydrochloric acid buffer solution having a pH of 8.5, subjected to a treatment with an ultrasonic wave generator of 10 Kc. for ten minutes and then separated by centrifugation. The supernatant is collected to obtain a crude enzymatic extract liquid having an L-asparaginase activity of 0.12 unit of specific activity (The unit of specific activity is an international unit indicating the activity of an enzyme by the number of $\mu$ moles of substrate decomposed in 1 minute and this representation of the specific activity is used in the present application).

After the substrate, L-asparagine, is added to the extract liquid in a concentration $10^{12}$M, dilute hydrochloric acid is dropped into the solution of 0° C. in order to adjust the pH value to 3.4. The resultant solution is left to stand for 5 minutes and, thereafter, the formed precipitates are removed by centrifugal separation in order to recover the supernatant whereby an enzymatic solution having a specific activity of 1.0 is obtained.

The activity of the inactivating factors of the resultant enzymatic solution is completely lost at the time of recovery, but no loss of activity of the L-asparaginase is observed even when the solution is left to stand at pH 5.5. Four liters of this solution (having a total activity of 4,500 units) is adjusted to a pH of 4.5 and is stirred with an addition of carboxymethylcellulose, whereby the activity is completely adsorbed. The activity thus adsorbed in carboxymethylcellulose is eluted with 4 liters of tris-buffer solution (pH 9.0) to obtain an L-asparaginase solution having a total activity of 3,200 units and a specific activity of 2.5. This enzyme is further purified to a specific activity of 20 by chromatography with diethylaminoethylcellulose, followed by rechromatography with diethylaminoethylcellulose and chromatography with Biogel D–150, whereby an enzymatic preparation having a specific activity of 120 is obtained in a 25 percent yield. This preparation completely cured an experimental leukemia in a mouse with a dosage of several µg.

The invention being thus described, it will be obvious that the same may be varied in many ways. Such variations are not to be regarded as a departure from the spirit and scope of the invention, and all such modifications as would be obvious to one skilled in the art are intended to be included herein.

What we claim is:

1. In a process for purifying L-asparaginase obtained from the cultured cells of an L-asparaginase-producing micro-organism belonging to the genus *Serratia*, the improvement which comprises adding L-asparagine to the enzyme-containing aqueous solution recovered from said cells and adjusting the pH of said solution to about 4.0 or less.

2. The process of claim 1, wherein the pH of said solution is adjusted to about 2.5–4.0.

3. The process of claim 1, wherein the pH of said solution is adjusted to about 3.0–3.5.

4. The process of claim 1, wherein approximately $10^{12}$ mole per liter of L-asparagine is added to said solution.

5. The process of claim 1, wherein hydrochloric acid is employed in order to adjust the pH of the solution.

6. The process of claim 1, wherein aid micro-organism is *Serratia marcescens*.

7. A process for producing a purified L-asparaginase preparation having a stable antitumor activity which comprises culturing an L-asparaginase-producing micro-organism belonging to the genus *Serratia* under aerobic conditions in an aqueous nutrient medium, recovering a crude enzyme-containing solution from the resultant culture liquor, adding L-asparagine to the solution, adjusting the pH of the solution to 2.5–4.0, and recovering L-asparaginase therefrom.

8. The process of claim 7, wherein the resultant L-asparaginase is further purified to obtain a highly pure L-asparaginase preparation.

9. The process of claim 7, wherein the pH adjustment is effected at a temperature of approximately 0° to 10° C.

10. The process of claim 7, wherein the pH of said solution is adjusted to about 3.0–3.5.

11. The process of claim 7, wherein approximately $10^{116\ 2}$ mole per liter of L-asparagine is added to said solution.

12. The process of claim 7, wherein hydrochloric acid is employed in order to adjust the pH of the solution.

13. The process of claim 7, wherein said micro-organism is *Serratia marcescens*.

14. The process of claim 7, wherein said micro-organism is *Serratia marcescens* ATCC 60.